United States Patent Office 3,839,575
Patented Oct. 1, 1974

3,839,575
2-[PYRAZOLYL-(1)]-BENZIMIDAZOLE FUNGICIDAL, AND BACTERICIDAL AGENTS
Walter Gauss, Cologne, Ferdinand Grewe, Burscheid, and Hans Scheinpflug, Leverkusen, Germany, assignors to Farbenfabriken Bayer Aktiengesellschaft, Leverkusen, Germany
No Drawing. Filed June 12, 1972, Ser. No. 261,829
Claims priority, application Germany, June 18, 1971,
P 21 30 030.1
Int. Cl. A01n 9/22
U.S. Cl. 424—273                7 Claims

ABSTRACT OF THE DISCLOSURE

Fungicidal, bactericidal, insecticidal and acaricidal compositions comprising, and methods of combating fungi, bacteria, insects or acarids using, 2-[pyrazolyl-(1')]-benzimidazoles of the general formula

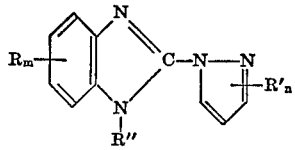

in which R and R' each independently is halogen, alkyl or optionally substituted alkoxy,
R" is hydrogen, alkyl or alkoxycarbonyl, and
$m$ and $n$ each independently is 0, 1 or 2, many of which are new compounds.

---

The present invention relates to and has for its objects the provision of fungicidal, bactericidal, insecticidal and acaricidal compositions of 2-[pyrazolyl-(1')]-benzimidazole which is optionally once substituted on the imidazole ring with an alkyl or alkoxycarbonyl group and optionally substituted on the benzene and/or pyrazole ring with a halogen, alkyl, alkoxy or substituted-alkoxy group, in the form of mixtures of such compounds with solid and liquid dispersible carrier vehicles, preferably containing a surface-active agent, and methods for using such compounds in a new way especially for combating fungi, bacteria, insects and acarids, with other and further objects becoming apparent from a study of the within specification and accompanying examples.

It has become generally known that, for the control of phytopathogenic fungi, N-trichloromethylthiotetrahydrophthalimide (Compound A) can be used; also generally known and widespread is the use of heavy metal salts of ethylene- and propylene-bis-dithiocarbamic acid as fungicides. The activity of the aforesaid compounds, however, is not always satisfactory, especially if the applied amounts are relatively low.

It has been found that the partially known 2-[pyrazolyl-(1')]-benzimidazoles of the general formula:

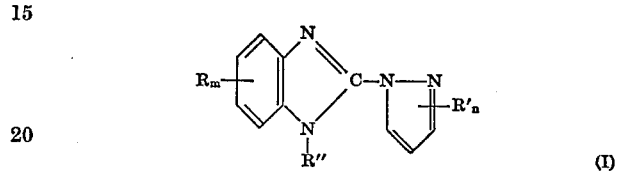

in which

R and R' each independently is halogen, alkyl or optionally substituted alkoxy,
R" is hydrogen, alkyl or alkoxycarbonyl, and
$m$ and $n$ each independently is 0, 1 or 2, exhibit strong fungicidal and bactericidal properties as well as insecticidal and acaricidal activity.

Surprisingly, the 2 - [pyrazolyl-(1')]-benzimidazoles which can be used according to the invention appear to show a considerably better effectiveness than the above-mentioned previously known compounds which have been widely applied as fungicides. The invention therefore represents a valuable enrichment of the art.

R and R' are preferably hydrogen, chlorine, bromine, straight-chain or branched lower alkyl with 1 to 4 carbon atoms, or lower alkoxy with 1 to 4 carbon atoms which may be substituted by a methoxy group. R" is preferably hydrogen, alkyl or alkoxycarbonyl wherein the alkyl moiety is straight-chain or branched with preferably 1 to 6 carbon atoms.

The following Table sets forth some of the active compounds which can be used according to the invention:

TABLE 1

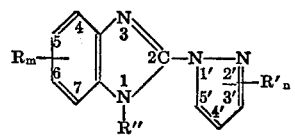

| Active compound No. | $R_m$ | $R'_n$ | $R''$ | M.P. (°C.) |
|---|---|---|---|---|
| (1) | | | H | 234 |
| (2) | 5-CH₃ | | H | 194 |
| (3) | | 3'-CH₃ | H | 218 |
| (4) | 5-CH₃O | | H+HCl, Zers. | 251 |
| (5) | 5-CH₃O | 3'-CH₃, 5'-CH₃ | H | 164–166 |
| (6) | 5-Cl | | H | 198–199 |
| (7) | 5-Cl | 3'-CH₃, 5'-CH₃ | H | 162–164 |
| (8) | | | CH₃ | 84–86 |
| (9) | | | n-C₄H₉ | 33–36 |
| (10) | 5-n-C₄H₉ | | H | 188–188.5 |
| (11) | | 3'-CH₃, 5'-CH₃ | H | 135–136.5 |
| (12) | 4-CH₃ | 3'-CH₃, 5'-CH₃ | H | 143.5–149 |
| (13) | 4-CH₃ | | H | 136 |
| (14) | 5-CH₃ | 3'-CH₃, 5'-CH₃ | H+H₂O | 87–94 |
| (15) | 4-Cl, 6-Cl | | H | 178.5–179.5 |
| (16) | 4-Cl, 6-Cl | 3'-CH₃ | H | 202.5–203.5 |
| (17) | 4-Cl, 6-Cl | 3'-CH₃, 5'-CH₃ | H | 149.5–150.5 |
| (18) | 5-Cl, 6-Cl | | H | 251–253 |
| (19) | | 4'-OCH₃ | H | 181–181.5 |
| (20) | | 4'-OCH(CH₃)₂ | H | 209–209.5 |
| (21) | | 4'-OCH₂CH₂OCH₃ | H | 146–147.5 |
| (22) | 5-Cl | 4'-OCH(CH₃)₂ | H | 191.5–192.5 |
| (23) | 4-Cl, 6-Cl | 4'-OCH₃ | H | 213–214.5 |
| (24) | | 4'-Cl | H | 188–188.5 |
| (25) | | | COOCH₃ | 94.5–95.5 |
| (26) | | | COOC₂H₅ | 75–76 |
| (27) | | | COOCH(CH₃)₂ | 65–66.5 |

The Compounds (1) to (8) of Table 1 are disclosed in Belgian patent specification 656,016. Compounds (9) to (27) are new; preparation of these compounds and their intermediates can, however, be effected in simple manner by processes known in principle. The compounds (9) to (24) are obtained, for example, when 2-mercaptobenzimidazoles are oxidized (for example with potassium permanganate or hydrogen peroxide) to give benzimidazole-2-sulfonic acids and the sulfonic acid group is replaced by a hydrazino group through use of hydrazine hydrate. By cyclization with 1,3-dicarbonyl compounds or their functional derivatives, for example with 1,1,3,3-tetraalkoxypropanes, acetoacetaldehydedialkylacetals, acetylacetone, 3-dialkylaminoacroleins or 2-alkoxy-3-dialkylaminoacroleins, the compounds (9) to (24) may be obtained. The compounds of the formula (I) in which R" is alkyl can also be prepared by subjecting substances of the formula (I) in which R" is hydrogen, advantageously in the form of their alkali metal compounds, to an alkylation, for example by means of alkyl halides. Thirdly, it is possible to prepare the compounds (1) to (24) by reacting 2-hydroxybenzimidazoles and pyrazoles in a molar ratio of 1:1 in the presence of phosphorus oxychloride, preferably at the boiling point of the mixture. Finally those compounds in which R" is alkoxycarbonyl, for example compounds (25) to (27), can be prepared by reaction of those compounds of the general formula (I) in which R" is hydrogen, with chloroformic acid alkyl esters or pyrocarbonic acid dialkyl esters.

The active compounds to be used according to the invention exhibit a strong fungitoxic activity and are distinguished by a broad activity spectrum. Fungitoxic agents in crop protection are used for the control of fungi from the most diverse classes of fungi, such as *Archimycetes, Phycomycetes, Ascomycetes, Basidiomycetes* and *Fungi Imperfecti.*

The active compounds exhibit not only the good properties of outstanding commercial preparations but additionally possess considerable advantages. These lie primarily in their ability to penetrate into the plant, to be systemically conducted, and to come to act fungitoxically at a distance from the place of application. They can be taken up from the seed surface, from the roots and also from above-the-soil plant organs after external application. Also, they have the advantageous ability to act locosystemically, that is, to exercise a deep effect in the plant tissue and eliminate fungal pathogenic agents which have already penetrated into the tissue of the host plant. Moreover, the substances also show against various fungal causative organisms of plant diseases, for example apple scab, *Piricularia* and *Pellicularia,* a considerably better effectiveness than known commercial preparations. Further, the present compounds have good effectiveness against phytopathogenic bacterial, for example *Xanthomonas oryzae.*

As crop protection agents, the active compounds can be used for soil treatment, for seed treatment and for the treatment of above-the-soil parts of plants. They are fungicidally especially effective against *Fusicladium dendriticum, Erysiphe cichoracearum, Podosphaera leucotricha, Piricularia oryzae, Pellicularia sasakii, Tilletia caries, Verticillium alboatrum, Fusarium nivale, Fusarium dianthi, Phialophora cinerescens, Cercospora musae* and *Colletotrichum coffeanum.*

The substances to be used according to the invention are generally well tolerated by plants. They possess only a low toxicity to warm-blooded animals and because of their lack of smell and their good compatibility with human skin are not unpleasant to handle.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethylsulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselgur, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, bactericides, insecticides and acaricides, or rodenticides, nematocides, herbicides, fertilizers, growth - regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95% by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

In the case of use as leaf fungicides, the concentrations of active compound in the application forms can be varied within a fairly wide range. In general, they are from about 0.5 to 0.0005 percent by weight, preferably about 0.2 to 0.001.

In the case of seed treatment, there are required, in general, amounts of active compounds of about 0.01 to 50 g. per kilogram of seed, preferably about 0.5 to 5 g.

For soil treatment, amounts of active compound of about 1 to 1000 g. per cubic meter of soil, preferably from about 10 to 200 g., are generally necessary.

The substances to be used according to the invention also show an insecticidal and acaricidal activity.

Furthermore, the present invention contemplates methods of selectively killing, combating or controlling pests, e.g. fungi, bacteria, insects and acarids, and more particularly methods of combating at least one of fungi and bacteria, which comprises applying to at least one of corresponding (a) such fungi, (b) such bacteria, (c) such insects, (d) such acarids, and (e) the corresponding habitat thereof, i.e. the locus to be protected, a corresponding combative or toxic amount, i.e. a fungicidally, bactericidally, insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Mycelium growth test

Nutrient medium used:

20 parts by weight agar-agar
200 parts by weight potato decoction
5 parts by weight malt
15 parts by weight dextrose
5 parts by weight peptone
2 parts by weight $Na_2HPO_4$
0.3 parts by weight $Ca(NO_3)_2$ Proportion of solvent to nutrient medium:

2 parts by weight solvent mixture
100 parts by weight agar nutrient medium

Composition solvent mixture:

0.19 parts by weight dimethyl formamide
0.01 parts by weight emulsifier arylalkylpolyglycol ether
1.80 parts by weight water
2.00 parts by weight solvent mixture The amount of active compound required for the desired concentration of active compound in the nutrient medium is mixed with the stated amount of solvent. The concentrate is thoroughly mixed in the stated proportion with the liquid nutrient medium which has been cooled to 42° C. and is then poured into Petri dishes of 9 cm. diameter. Control dishes to which the preparation has not been added are also set up.

When the nutrient medium has cooled and solidified, the dishes are inoculated with the species of fungi stated in the Table and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0—no fungus growth
1—very strong inhibition of growth
2—medium inhibition of growth
3—slight inhibition of growth
4—growth equal to that of untreated control.

The active compounds, their concentrations and the results obtained can be seen from Table 2:

TABLE 2.—MYCELIUM GROWTH TEST

| Active compound No. | Fungi and one bacterium—Concentration of active compound, p.p.m. | | | | | | | | |
|---|---|---|---|---|---|---|---|---|---|
| | Piricularia oryzae | Phialophora cinerescens | Pellicularia sasakii | Mycosphaerella musicola | Verticillium alboatrum | Fusarium dianthi | Cochliobolus miyabeanus | Colletotrichum coffeanum | Xanthomonas oryzae |
| (B) CH$_3$—CH—NH—CS—S \\ \| \ \ \ \ \ \ \ \ \ \ \ \ \ \ \ \ \ \ \ \ \ \ \ \ \ \ \ \ Zn \\ CH$_2$—NH—CS—S / | ---------- | 4 | 3 | 1 | 4 | 4 | 4 | 4 | 4 |
| (known). | | | | | | | | | |
| (1) | 0 | 0 | 1 | 0 | 0 | 0 | 2 | 0 | 0 |
| (2) | 0 | 3 | | 0 | 0 | 0 | | 0 | |
| (6) | 0 | 0 | 3 | 0 | 0 | 2 | 1 | 0 | 1 |
| (13) | 0 | 0 | | 0 | 1 | 1 | | 0 | |
| (15) | 0 | 0 | 3 | 0 | 0 | 3 | 2 | 0 | 1 |
| (16) | 0 | 3 | | | | 3 | 3 | 3 | 0 |
| (19) | 0 | 3 | | 1 | | 3 | 3 | 0 | 2 |
| (24) | 0 | 0 | 2 | 0 | 0 | 0 | 0 | 3 | 0 |

EXAMPLE 2

Erysiphe test (systemic)

Solvent: 4.7 parts by weight acetone
Dispersing agent: 0.3 parts by weight alkylaryl polyglycol ether
Water: 95 parts by weight The amount of the active compound required for the desired concentration of active compound in the spray liquid is mixed with the stated amount of the solvent, and the concentrate is diluted with the stated amount of water containing the stated additions.

Young cucumber plants with about 1 or 2 foliage leaves are watered three times in one week, each time with 20 cc. of water containing the stated concentration of active compound with reference to 100 cc. of soil. They are then, for the purpose of inoculation, dusted with conidia of the fungus *Erysiphe cichoracearum*. The plants are subsequently placed in a greenhouse at 23–24° C. and at a relative atmospheric humidity of about 70%. After 12 days, the infection of the cucumber plants is determined as a percentage of the untreated but also inoculated control plants. 0% means no infection; 100%, that the infection is exactly as great as in the case of the control plants.

The active compounds, the concentrations of the active compounds and the results obtained can be seen from the following Table 3:

TABLE 3.—ERYSIPHE TEST/SYSTEMIC

| Active compound No. | Infection [1] |
|---|---|
| (1) | 0 |
| (25) | 0 |
| (26) | 37 |
| (27) | 57 |

[1] As a percentage of the infection of the untreated control with a concentration of active compound of 120 p.p.m.

EXAMPLE 3

Podosphaera test (powdery mildew of apples)
[Protective]

Solvent: 4.7 parts by weight acetone
Emulsifier: 0.3 parts by weight alkylaryl polyglycol ether
Water: 95 parts by weight The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated by dusting with conidia of the apple powdery mildew causative organism (*Podosphaera leucotricha* Salm.) and placed in a greenhouse at a temperature of 21–23° C. and at a relative atmospheric humidity of about 70%.

Ten days after the inoculation, the infestation of the seedlings is determined as a percentage of the untreated but also inoculated control plants.

0% means no infestation; 100% means that the infestation is exactly as great as in the case of the control plants.

The active compounds, the concentrations of the active compounds and the results obtained can be seen from the following Table 4:

TABLE 4.—PODOSPHAERA TEST/PROTECTIVE

| Active compound No. | Infection as a percentage of the infection of the untreated control with a concentration of active compound of— | | | |
|---|---|---|---|---|
| | 0.025 | 0.0062 | 0.0031 | 0.00156 |
| (A) (known) | 100 | 100 | 100 | 100 |
| (1) | 0 | 0 | | 26 |
| (15) | 0 | 12 | 22 | |
| (25) | 0 | | | 30 |
| (26) | 0 | 8 | | 66 |
| (27) | 0 | 24 | | |

Compound (A) structure: phthalimide-type with N-S-CCl₃ group.

EXAMPLE 4

Podosphaera test (systemic)

Solvent: 4.7 parts by weight acetone
Dispersing agent: 0.3 parts by weight alkylaryl polyglycol ether
Water: 95 parts by weight.

The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered in one week with 20 cc. of the liquid to be used for watering, in the stated concentration of active compound, with reference to 100 cc. of soil. The plants so treated are, after the treatment, inoculated with conidia of *Podosphaera leucotricha* Salm. and placed a greenhouse at a temperature of 21–23° C. and at a relative atmospheric humidity of about 70%. 10 days after the inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results obtained can be seen from the following Table 5:

TABLE 5.—PODOSPHAERA TEST/SYSTEMIC

| Active compound No. | Infection [1] |
|---|---|
| (1) | 4 |
| (25) | 17 |
| (26) | 26 |

[1] As a percentage of the infection of the untreated control with a concentration of active compound of 60 p.p.m.

EXAMPLE 5

Fusicladium test (systemic)

Solvent: 4.7 parts by weight acetone
Emulsifier: 0.3 parts by weight alkylaryl polyglycol ether
Water: 95 parts by weight.

The amount of the active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in one week with 20 cc. of the liquid to be used for watering, in the stated concentration of active compound, with reference to 100 cc. of soil. The plants so treated are, after the treatment, inoculated with an aqueous conidium suspension of *Fusicladium dendriticum Fuckel* and incubated for 18 hours in a humidity chamber at 18–20° C. and at a relative atmospheric humidity of 100%. The plants are subsequently placed in a greenhouse for 14 days.

151 days after inoculation, the infection of the seedlings is determined as a percentage of the untreated but also inoculated control plants. 0% means no infection; 100% means that the infection is exactly as great as in the case of the control plants.

The active compounds, the concentrations of the active compounds and the results obtained can be seen from the following Table 6:

TABLE 6.—FUSICLADIUM TEST/SYSTEMIC

| Active compound No. | Infection as a percentage of the infection of the untreated control with a concentration of active compound (p.p.m.) of— | | |
|---|---|---|---|
| | 120 | 60 | 30 |
| (1) | | 13 | |
| (25) | 0 | 0 | 18 |
| (26) | | 29 | 35 |
| (27) | 16 | 54 | 94 |

EXAMPLE 6

Fusicladium test (apple scab) (Curative)

Solvent: 4.7 parts by weight acetone
Emulsifier: 0.3 parts by weight alkylaryl polyglycol ether
Water: 95 parts by weight.

The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are inoculated with an aqueous condium suspension of the apple scab causative organism (*Fusicladium dendriticum Fuckel*) and incubated for 18 hours in a humidity chamber at 18–20° C. and at an atmospheric humidity of 100%. The plants are then placed in a greenhouse where they dry.

After standing for a suitable period of time, the plants are sprayed dripping wet with the spray liquid prepared in the manner described above. The plants are again planced in a greenhouse.

15 days after inoculation, the infestation of the apple seedlings is determined as a percentage of the untreated but also inoculated control plants.

0% means no infestation; 100% means that the infestation is exactly as great as in the case of the control plants.

The active compounds, the concentrations of the active compounds, the period of time between inoculation and spraying and the results obtained can be seen from the following Table 7:

TABLE 7.—FUSICLADIUM TEST/CURATIVE

| Active compound No. | Residence period in hour 42 | Infection [1] |
|---|---|---|

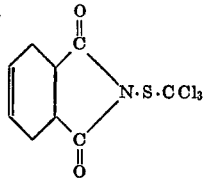

(known).

| | |
|---|---|
| (1) | 3 |
| (26) | 18 |
| (27) | 35 |

[1] As a percentage of the infection of the untreated control with a concentration of active compound of 0.025%.

EXAMPLE 7

Fusicladium test (apple scab) (Protective)

Solvent: 4.7 parts by weight acetone
Emulsifier: 0.3 parts by weight alkylaryl polyglycol ether
Water: 95 parts by weight.

The amount of active compound required for the desired concentration of the active compound in the spray liquid is mixed with the stated amount of solvent, and the concentrate is diluted with the stated amount of water which contains the stated additions.

Young apple seedlings in the 4–6 leaf stage are sprayed with the spray liquid until dripping wet. The plants remain in a greenhouse for 24 hours at 20° C. and at a relative atmospheric humidity of 70%. They are then inoculated with an aqueous conidium suspension of the apple scab causative organism (*Fusicladium dendriticum Fuckel*) and incubated for 18 hours in a humidity chamber at 18–20° C. and at a relative atmospheric humidity of 100%.

The plants then again come into a greenhouse for 14 days.

15 days after inoculation, the infection of the seedlings is determined as a percentage of the untreated but also inoculated control plants.

0% means no infection; 100% means that the infection is exactly as great as in the case of the control plants.

The active compounds, the concentrations of the active compounds and the results can be seen from Table 8:

TABLE 8.—FUSICLADIUM TEST/PROTECTIVE

| Active compound No. | Infection as a percentage of the infection of the untreated control with a concentration of active compound of— | | |
|---|---|---|---|
| | 0.025 | 0.0062 | 0.00156 |
| (A) | 3 | 11 | 53 |

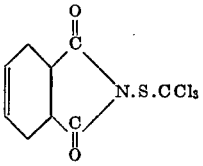

(known).

| | | | |
|---|---|---|---|
| (1) | 0 | 7 | 31 |
| (9) | 0 | | |
| (15) | 3 | 5 | |
| (25) | 0 | | |
| (26) | 0 | | |
| (27) | 2 | | |

EXAMPLE 8

Piricularia and Pellicularia Test [Protective]

Solvent: 1.9 parts by weight dimethyl formamide
Dispersing agent: 0.1 part by weight alkylarylpolyglycol ether
Water: 98 parts by weight The amount of active compound required for the desired concentration of active compound in the spray liquor is mixed with the stated amount of solvent, and of the dispersing agent, and the concentrate is diluted with the stated amount of water.

2 batches each consisting of 30 rice plants about 2–4 weeks old are sprayed with the spray liquor until dripping wet. The plants remain in a greenhouse at temperatures of 22 to 24° C. and a relative atmospheric humidity of about 70% until they are dry. One batch of the plants is then inoculated with an aqueous suspension of 100,000 to 200,000 spores/ml. of *Piricularia oryzae* and placed in a chamber at 24–26° C. and 100% relative atmospheric humidity. The other batch of the plants is infected with a culture of *Pellicularia sasakii* grown on malt agar and placed at 28–30° C. and 100% relative atmospheric humidity.

5 to 8 days after inoculation, the infection of all the leaves present at the time of inoculation with *Piricularia oryzae* is determined as a percentage of the untreated but also inoculated control plants. In the case of the plants infected with *Pellicularia sasakii*, the infection on the leaf sheaths after the same time is also determined in proportion to the untreated but infected control. 0% means no infection; 100% means that the infection is exactly as great in the case of the control plants.

The active compounds, the concentrations of the active compounds and the results obtained can be seen from the following Table 9:

TABLE 9

Piricularia (*a*) and pellicularia (*b*) test/protective

| Active compound No. | Infection as a percentage of the infection of the untreated control with a concentration of active compound of— | | |
|---|---|---|---|
| | *a* | | *b*, |
| | 0.05 | 0.025 | 0.05 |
| (B)..... CH₃—CH—NH—CS—S \ Zn / CH₂—NH—CS—S (known). | 25 | 100 | 10 |
| (6) | 0 | 25 | 50 |
| (15) | 8 | | |
| (16) | 18 | 62 | |

The compounds (1) to (8) listed hereinabove are known and can be prepared according to Belgian patent specification 656,016. Of the new compounds (9) to (27), a preferred sub-group is that in which R is halogen, lower alkyl or optionally substituted alkoxy,
R' is halogen, lower alkyl, lower alkoxy or methoxy-lower alkoxy,
R" is lower alkoxy carbonyl,
*m* is 0, 1 or 2, and *n* is 0 or 1.

The preparation of the new compounds is illustrated by the following Examples:

EXAMPLE 9

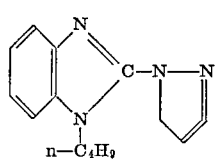

(9)

A mixture of 36.8 g. of 2-[pyrazolyl-(1')]-benzimidazole of the melting point 234° C. (see Belgian patent specification 656,016), 105 ml. of a methanolic sodium methylate solution containing 0.22 mole of NaOCH₃ and 250 ml. of toluene is fractionated in a column until complete removal of the methanol occurs. Concentration in a vacuum at a bath temperature of 90° C. is then effected. To the residue there are added 200 ml. of anhydrous dimethyl formamide and 21.4 ml. of n-butyl bromide, and heating to 80° C. for 4 hours is effected. The reaction mixture is concentrated as far as possible in a vacuum at 90° C. and the liquid residue is distributed between 200 ml. of 2n NaOH and 200 ml. of toluene. After separation, the organic phase is washed with normal sodium hydroxide solution and water, dried with sodium sulfate and freed from solvent in a vacuum. The gradually crystallizing residue is recrystallized from petroleum ether. 28.3 g. of 1-n-butyl-2-[pyrazolyl-(1')]-benzimidazole of m.p. 33–36° C. are obtained.

EXAMPLE 10

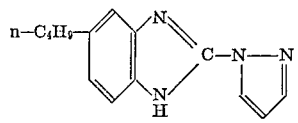

(10)

The 2-hydrazino-5-n-butylbenzimidazole obtained from 47.9 g. of 5-n-butylbenzimidazole-2-sulfonic acid by reaction with hydrazine hydrate is heated to 80° C. for 2 hours with 160 ml. of water, 35 ml. of concentrated hydrochloric acid, 95 ml. of methanol and 37 g. of 1,1,3,3-tetramethoxypropane. Adjustment to pH 7 is effected with solution of sodium carbonate, the product is filtered off with suction (41.7 g. of m.p. 186–187° C.), and purification is effected by recrystallization from ethanol. 30.8 g. of 2-[pyrazolyl - (1')]-5-n-butylbenzimidazole of m.p. 188–188.5° C. are obtained.

EXAMPLE 11

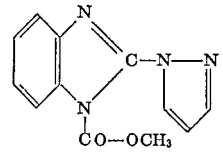

(25)

A mixture of 36.8 g. (0.2 mole) of compound (1) and 105 ml. of a methanol solution containing 0.22 mole of sodium methylate is fractionated in a column with 500 ml. of toluene until the boiling point of the toluene is reached. To the residue are added 19.1 ml. (0.25 mole) of chloroformic acid methyl ester and the temperature is kept at 105° C. for 2.5 hours. Suction filtration from the salt mixture is effected in the cold, followed by washing with toluene and concentration of the filtrate in a vacuum. The residue (42 g. of m.p. 83–89° C.) is precipitated cold with 250 ml. of normal hydrochloric acid, whereby 36.6 g. of crude 1-methoxycarbonyl-2-[pyrazolyl-(1')]-benzimidazole of m.p. 93–95° C. are obtained. By recrystallization from cyclohexane, 29.3 g. of pure compound of m.p. 94.5–95.5° C. are obtained.

It will be appreciated that the instant specification and examples are set forth by way of illustration and not limitation, and that various modifications and changes may be made without departing from the spirit and scope of the present invention.

What is claimed is:

1. A method of combating phytopathogenic fungi or bacteria pests which comprises applying to said pest a fungicidally or bactericidally effective amount of a 2-[pyrazolyl-(1')]-benzimidazole of the formula

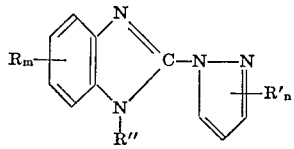

in which

R and R' each independently is chlorine, bromine, alkyl of 1 to 4 carbon atoms, alkoxy of 1 to 4 carbon atoms or methoxyethoxy,
R" is hydrogen, alkyl of 1 to 4 carbon atoms or alkoxycarbonyl wherein the alkoxy moiety has 1 to 3 carbon atoms, and
*m* and *n* each independently is 0, 1 or 2.

2. The method of claim 1, wherein said 2-[pyrazolyl-(1')]-benzimidazole is 2-[pyrazolyl-(1')]-benzimidazole of the formula

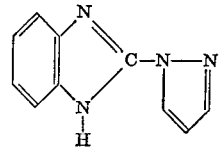

(1)

3. The method of claim 1, wherein said 2-[pyrazolyl-(1′)]-benzimidazole is 1-n-butyl-2-[pyrazolyl-(1′)-benzimidazole of the formula

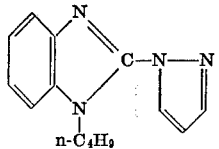

(9)

4. The method of claim 1, wherein said 2-[pyrazolyl-(1′)]-benzimidazole is 1-methoxycarbonyl - 2 - [pyrazolyl-(1′)]-benzimidazole of the formula

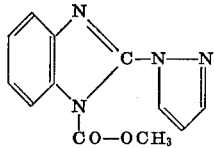

(25)

5. The method of claim 1, wherein said 2-[pyrazolyl-(1′)]-benzimidazole is 1-ethoxycarbonyl - 2 - [pyrazolyl-(1′)]-benzimidazole of the formula

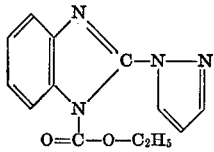

(26)

6. The method of claim 1, wherein said 2-[pyrazolyl-(1′)]-benzimidazole is 1-isopropoxycarbonyl - 2 - [pyrazolyl-(1′)]-benzimidazole of the formula

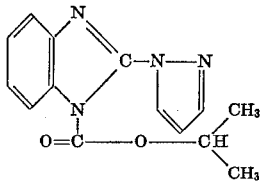

(27)

7. The method of claim 1 wherein said compound is 2-[3′,5′-dimethyl-pyrazolyl-(1′)]-benzimidazole.

References Cited

UNITED STATES PATENTS

| | | | |
|---|---|---|---|
| 3,590,047 | 6/1971 | Shen et al. | 260—309.2 |
| 3,609,166 | 9/1971 | Gauss et al. | 260—309.2 |

FOREIGN PATENTS

| | | |
|---|---|---|
| 656,016 | 3/1965 | Belgium. |
| 1,178,982 | 1/1970 | Great Britain. |

ALBERT T. MEYERS, Primary Examiner
A. J. ROBINSON, Assistant Examiner

U.S. Cl. X.R.
424—DIG. 8

UNITED STATES PATENT OFFICE
CERTIFICATE OF CORRECTION

Patent No. 3,839,575      Dated October 1, 1974

Inventor(s) WALTER GAUSS ET AL

It is certified that error appears in the above-identified patent and that said Letters Patent are hereby corrected as shown below:

Col. 9, line 3, cancel "151" and substitute -- 15 --.

Col. 9, line 36, correct spelling of "conidium".

Col. 11, line 23 - Table 9, under heading $\frac{b,}{0.05}$ , Compound (B), cancel "10" and substitute -- 100 --.

Col. 11, Compound (9), correct formula to read as follows:

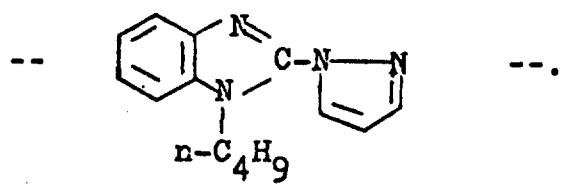

Signed and sealed this 1st day of April 1975.

(SEAL)
Attest:

RUTH C. MASON
Attesting Officer

C. MARSHALL DANN
Commissioner of Patents
and Trademarks